United States Patent
Hong

(10) Patent No.: US 9,697,670 B2
(45) Date of Patent: Jul. 4, 2017

(54) PREPAYMENT-TYPE WATT-HOUR METER

(71) Applicant: LSIS CO., LTD., Anyang-si, Gyeonggi-do (KR)

(72) Inventor: Gwon Hwan Hong, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/701,204

(22) Filed: Apr. 30, 2015

(65) Prior Publication Data

US 2015/0324874 A1 Nov. 12, 2015

(30) Foreign Application Priority Data

May 8, 2014 (KR) .......... 10-2014-0054996

(51) Int. Cl.
| | |
|---|---|
| *G06F 17/00* | (2006.01) |
| *G07F 15/06* | (2006.01) |
| *G06Q 30/04* | (2012.01) |
| *G06Q 20/28* | (2012.01) |
| *G06Q 50/06* | (2012.01) |
| *G01R 22/00* | (2006.01) |

(52) U.S. Cl.
CPC ............ *G07F 15/06* (2013.01); *G01R 22/00* (2013.01); *G06Q 20/28* (2013.01); *G06Q 30/04* (2013.01); *G06Q 50/06* (2013.01)

(58) Field of Classification Search
CPC ........ G06Q 50/06; G06Q 20/18; G06Q 20/28; G07F 15/005; G07F 15/003; G07F 15/12; Y04S 50/12
See application file for complete search history.

(56) References Cited

U.S. PATENT DOCUMENTS

| | | | | |
|---|---|---|---|---|
| 5,243,654 | A * | 9/1993 | Hunter | G06Q 20/401 380/51 |
| 2007/0083479 | A1* | 4/2007 | Swartz | G06Q 20/28 705/412 |
| 2008/0033892 | A1* | 2/2008 | Neri-Badillo | G06Q 30/0283 705/412 |
| 2011/0153474 | A1* | 6/2011 | Tormey | G06Q 20/40 705/31 |
| 2011/0191265 | A1* | 8/2011 | Lowenthal | B60L 3/12 705/412 |
| 2011/0279083 | A1* | 11/2011 | Asai | B60L 11/1816 320/109 |

(Continued)

FOREIGN PATENT DOCUMENTS

| | | |
|---|---|---|
| CN | 201084214 | 7/2008 |
| CN | 201259704 | 6/2009 |

(Continued)

*Primary Examiner* — Claude J Brown
(74) *Attorney, Agent, or Firm* — Lee Hong Degerman Kang & Waimey

(57) ABSTRACT

Provided is a prepayment-type watt-hour meter including: a code recognition that recognizes a code image in which information on prepayment of a charge-based amount of electric power that is to be consumed by a load is stored as coded, and that recognizes the information on the prepayment that is stored in the code image; and a control unit that measures an amount of electric power consumption by the load, and that calculates the electric bill for the measured amount of electric power, based on the information on the prepayment that is recognized by the code recognition unit.

15 Claims, 5 Drawing Sheets

(56) References Cited

U.S. PATENT DOCUMENTS

| | | | | |
|---|---|---|---|---|
| 2012/0229085 A1* | 9/2012 | Lau | ................... | B60L 11/1818 |
| | | | | 320/109 |
| 2012/0234409 A1* | 9/2012 | Klicpera | ............... | B05B 12/004 |
| | | | | 137/551 |
| 2013/0024306 A1* | 1/2013 | Shah | ...................... | G06Q 20/32 |
| | | | | 705/17 |
| 2013/0207605 A1* | 8/2013 | Errattuparambil | ..... | G06Q 20/18 |
| | | | | 320/109 |
| 2013/0346176 A1* | 12/2013 | Alolabi | .............. | G06Q 30/0222 |
| | | | | 705/14.23 |
| 2014/0239742 A1* | 8/2014 | Elias | ........................ | H01H 9/54 |
| | | | | 307/131 |

FOREIGN PATENT DOCUMENTS

| | | |
|---|---|---|
| CN | 201477674 | 5/2010 |
| CN | 202632421 | 12/2012 |
| JP | 08-115371 | 5/1996 |
| JP | 2004-258763 | 9/2004 |
| JP | 2006344144 | 12/2006 |
| JP | 2012155411 | 8/2012 |
| JP | 2012-190401 | 10/2012 |
| JP | 2012-242911 | 12/2012 |
| JP | 2014-10074 | 1/2014 |
| JP | 2014-34129 | 2/2014 |
| KR | 10-0157941 | 8/1998 |
| KR | 10-2006-0012694 | 2/2006 |

\* cited by examiner

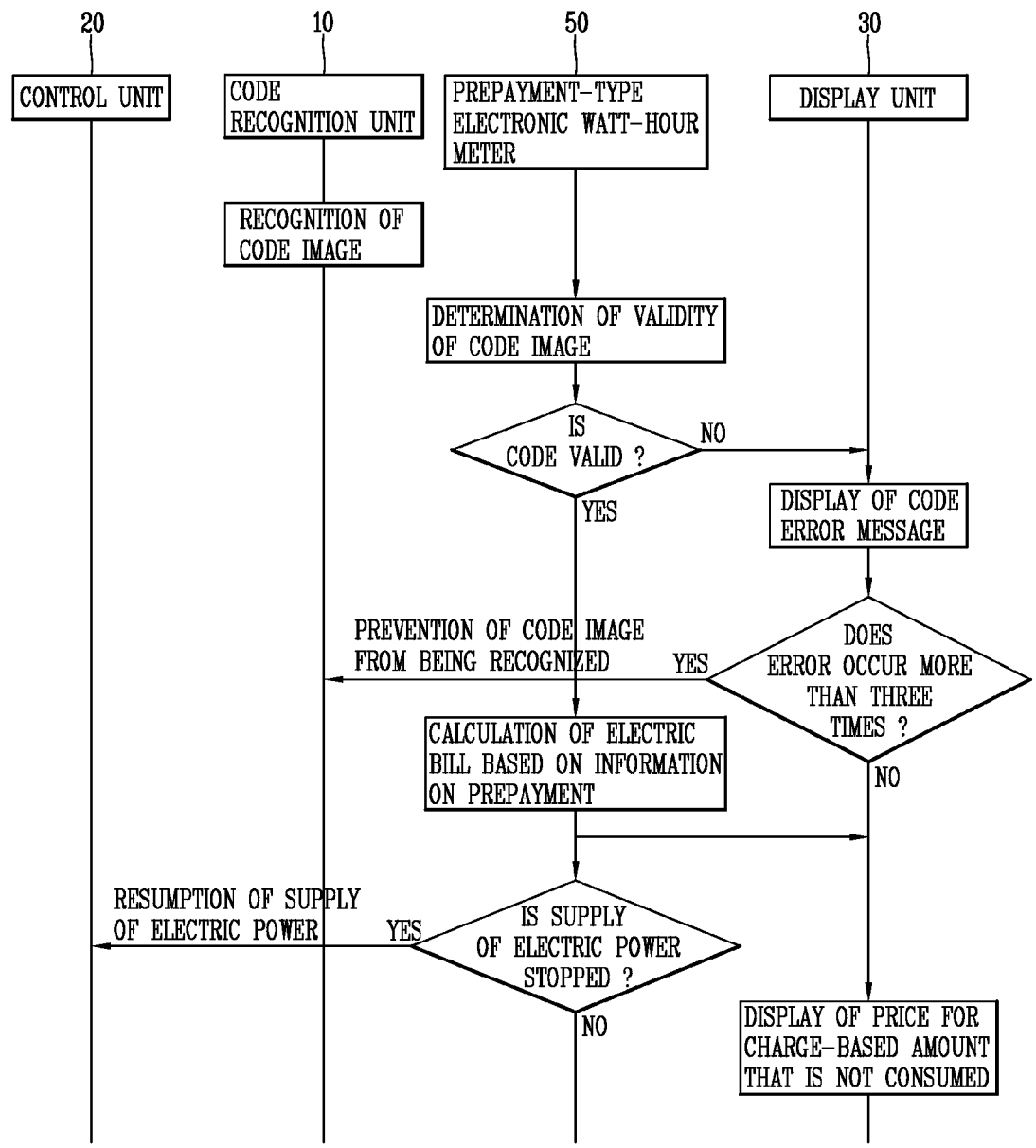

PREPAYMENT-TYPE WATT-HOUR METER

CROSS-REFERENCE TO RELATED APPLICATION

Pursuant to 35 U.S.C. §119(a), this application claims the benefit of earlier filing date and right of priority to Korean Patent Application No. 10-2014-0054996, filed on May 8, 2014, the contents of which are all hereby incorporated by reference herein in its entirety.

BACKGROUND OF THE DISCLOSURE

1. Field of the Disclosure

The present disclosure relates to a prepayment-type watt-hour meter, and more particularly to a prepayment-type watt-hour meter that recognizes a code image in which information on prepayment is stored and, based on the information on the prepayment, calculates an electric bill.

2. Background of the Disclosure

FIGS. 1A and 1B are a diagram illustrating an example of a prepayment-type watt-hour meter in the related art.

FIG. 2 is a flowchart illustrating a process that is performed by the prepayment-type watt-hour meter in the related art.

In preparation for a prepayment-type billing system, the prepayment-type watt-hour meter in the related art includes an input unit for inputting information on a charge-based amount of electric power. There are two types of input units: a keypad type (FIG. 1A) and a card sensing type (FIG. 1B). When, using the keypad, a user inputs a code that includes the information on the charge-based amount of electric power that is paid for, a calculation unit of the prepayment-type watt-hour meter in the related art, which performs the process illustrated in FIG. 2, detects a validity of such an input code. In a case where it is determined that the input code includes the information on the legitimate charge-based amount, the prepayment-type watt-hour meter in the related art adds the legitimate charge-based amount to an existing charged-based amount that is stored in the prepayment-type watt-hour meter, thereby allowing electric power to be consumed by as much as a sum of the legitimate charge-based amount and the existing charge-based amount. Then, a price for the charge-base amount of electric power that is not consumed is displayed on the display unit of the prepayment-type watt-hour meter. When the validity of the code being input is found erroneous, an input code error message is displayed on the display unit. In a case where the error occurs more than three times, a function of inputting the information on the charge-based amount using the keypad is suspended for a predetermined time. The input unit that is the card sensing type also receives the information on the charge-based amount of electric power from a card that comes into contact with the input unit, and reads the charge-based amount of electric power.

A problem with the keypad type in the related art is that an error is likely to occur when a code is lengthy or an old person inputs the code. Another problem is that when an input occurs repeatedly, a function of preventing an input is likely to be performed for a long period of time. A further problem is that in the case of the card sensing type is that there occur additional costs of manufacturing and selling the card, A still further problem is that some users think the use of the card inconvenient. A still further problem is that, in a case where a prepayment-type card for consuming electric power is issued to a poor senior citizen who lives alone in terms of welfare for the poor senior citizen, there is a likelihood that the card will be used for the unlawful purpose such as a copy of the code, a transfer of the code, and a lease of the code.

SUMMARY OF THE DISCLOSURE

Therefore, an aspect of the detailed description is to provide a prepayment-type watt-hour meter that is capable of recognizing information on prepayment through an easily-recognizable code image and calculating an electric bill based in this in order to solve the problems described above.

To achieve these and other advantages and in accordance with the purpose of this specification, as embodied and broadly described herein, there is provided a prepayment-type watt-hour meter including: a code recognition that recognizes a code image in which information on prepayment of a charge-based amount of electric power that is to be consumed by a load is stored as coded, and that recognizes the information on the prepayment that is stored in the code image; and a control unit that measures an amount of electric power consumption by the load, and that calculates the electric bill for the measured amount of electric power, based on the information on the prepayment that is recognized by the code recognition unit.

In the prepayment-type watt-hour meter, the code image may be an image in the format of a barcode. In the prepayment-type watt-hour meter, the code image may be an image in the format of any one of a quick response (QR) code, an Aztec code, and a data matrix code.

In the prepayment-type watt-hour meter, based on the information on the prepayment, a price for the charge-based amount of electric power may be deducted from the calculated electric bill, or electric power may be additionally consumed by as much as the price for the charge-based amount of electric power.

In the prepayment-type watt-hour meter, the code recognition unit may scan and recognize the code image.

In the prepayment-type watt-hour meter of claim 1, the code recognition unit may recognize the code image and thus determine a validity of the code image, and in a case where the code image is valid, may recognize the information on the prepayment.

In the prepayment-type watt-hour meter, the control unit may calculate the electric bill based on the amount of electric power consumption and the information on the prepayment, but may calculate the electric bill in such a manner that a price of the approved amount of electric power corresponding to the information on the prepayment is deducted from the electric bill.

In the prepayment-type watt-hour meter, the control unit may allow electric power to be additionally used by as much as the electric bill corresponding to the information on the prepayment.

In the prepayment-type watt-hour meter, in a case where an amount of electric power that is additionally consumed falls short of the charge-based amount of electric bill corresponding to the information on the prepayment, the control unit may generate repayment information for returning an unconsumed portion of the charge-based amount of electric power corresponding to the information on the prepayment, and may generate and outputs a repayment code image in which the information on the repayment is stored.

In the prepayment-type watt-hour meter, in a case the code recognition unit recognizes the information on the prepayment, but supply of electric power to the load is stopped, the control unit may perform control that resumes the supply of electric power to the load based on the charge-based amount of electric power corresponding to the information on the prepayment.

The prepayment-type watt-hour meter may further include a display unit on which the amount of electric power consumption, the electric bill and the information on the prepayment are externally displayed.

The prepayment-type watt-hour meter may further include a display unit on which the amount of electric power consumption, the electric bill and the information on the prepayment are externally displayed.

The prepayment-type watt-hour meter disclosed in the present specification recognizes the information on the prepayment through the code image in which the information on the prepayment is stored, and an advantage of recognizing the information on the prepayment in a fast, convenient manner is provided.

The prepayment-type watt-hour meter disclosed in the present specification recognizes the information on the prepayment through the code image in which the information on the prepayment is stored, and thus an advantage of making the prepayment of the approved amount for electric power in a convenient manner without adding separate constituent elements and a separate device is provided.

The prepayment-type watt-hour meter disclosed in the specification recognizes the information on the prepayment that is stored in the code image, and based on this, calculates the electric bill, thereby providing an advantage of supplying electric power and controlling the supply of electric power in various manners.

The prepayment-type watt-hour meter disclosed in the present specification recognizes the information on the prepayment that is stored in the code image, and based on this, calculates the electric bill, thereby providing an advantage of calculating the electric bill and making the payment of the calculated electric bill in various manners.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 5 is a flowchart illustrating an operational process that is performed by the prepaid type watt-hour according to the embodiment of the present invention, which is described in the present disclosure.

DETAILED DESCRIPTION OF THE DISCLOSURE

Figure 1A:
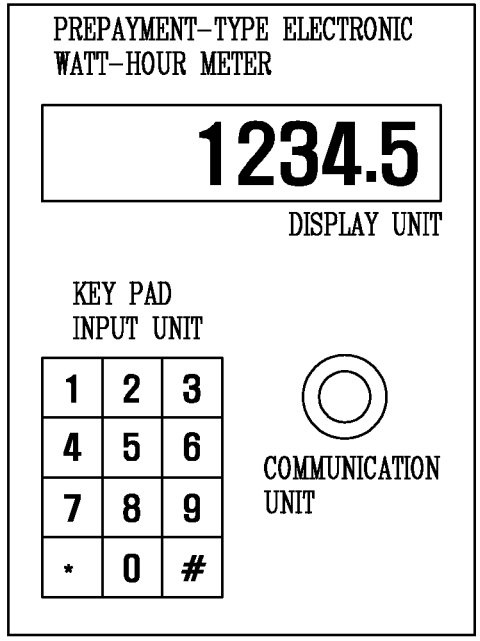
FIGS. 1A and 1B are a diagram illustrating an example of a prepayment-type watt-hour meter in the related art.
Figure 1B:
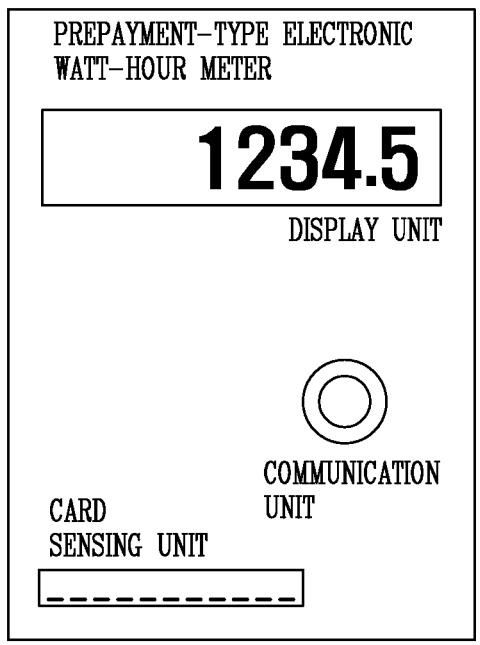
Figure 2:
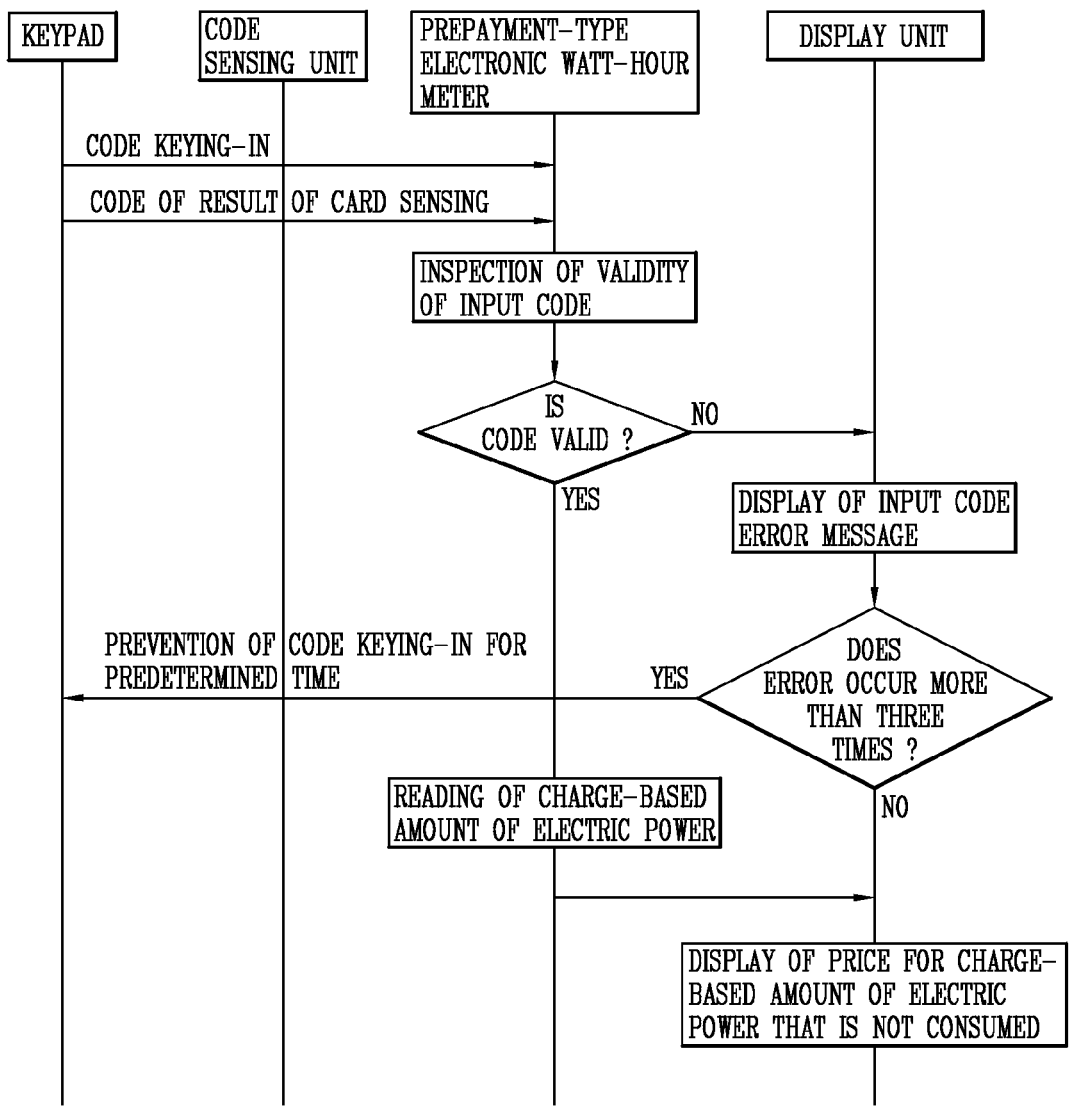
FIG. 2 is a flowchart illustrating a process that is performed by the prepayment-type watt-hour meter in the related art.

Description will now be given in detail of the exemplary embodiments, with reference to the accompanying drawings. For the sake of brief description with reference to the drawings, the same or equivalent components will be provided with the same reference numbers, and description thereof will not be repeated.

The prevent invention disclosed in the present specification is applied to a prepayment-type watt-hour meter. However, the present invention disclosed in the present specification is not limited to this, and can be also applied to all existing watt-hour meters to which the technical idea of the present invention can be applied, such as an electric bill payment device, an electric bill payment system, an electric power supply device, an electric power supply system, an electric power control device, and an electric power control system.

Technical terms used in the present specification are only for describing specific embodiments. It should be noted that the technical terms are not intended to impose any limitation to the technical idea disclosed in the present specification. In addition, the technical terms used in the specification should be construed in such a manner that they are usually understandable to a person of ordinary skill in the art that the technology disclosed in the present specification pertains to, unless otherwise specifically defined in the present specification. The technical terms should not be construed too broadly or too narrowly. In addition, when the technical terms used in the present specification are ones that do not exactly express the technical idea disclosed in the present specification, they should be replaced with the ones fully understandable to a person of ordinary skill and be accordingly understood. In addition, general terms used in the present specification should be construed as defined in a dictionary or as understood in the context and should not be construed too narrowly.

In addition, an element that is expressed as being in the singular in the present specification should be construed to cover one or more than one, unless otherwise clearly meant in the content. Expressions, such as "is configured from constituents or steps" and "includes constituent elements or steps," which are used in the present specification, should not be construed as necessarily including all the constituent elements or all the steps, and should be construed in such a manner that among all the constituent elements or among all the steps, some of the constituent elements or some of the steps may not be included, or in such a manner that additional constituent elements or additional steps may be further included.

Embodiments disclosed in the present specification are described below referring to the accompanying drawings. Like constituent elements are given like reference numerals and redundant descriptions of the like constituent elements are avoided.

In addition, when the technology disclosed in the present specification is described, in a case where it is determined that a detailed description of a relevant known technology known in the art makes the nature and gist of the present invention indistinctive, such a detailed description of the technology is omitted. In addition, the accompanying drawings are only for helping get an easy understanding of the technical idea disclosed in the present specification. It should be noted that the accompanying drawings are not construed as imposing any limitation on the technical idea.

The prepayment-type watt-hour meter (hereinafter referred to as a watt-hour meter) according to an embodiment of the present invention will be described below referring to FIGS. 3 to 6B.

Figure 3:
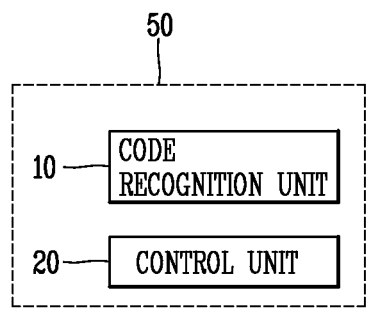
FIG. 3 is a block diagram illustrating a configuration of a prepayment-type watt-hour meter disclosed in the present specification.

FIG. 3 is a block diagram illustrating a configuration of the prepayment-type watt-hour meter disclosed in the present specification.

Figure 4:
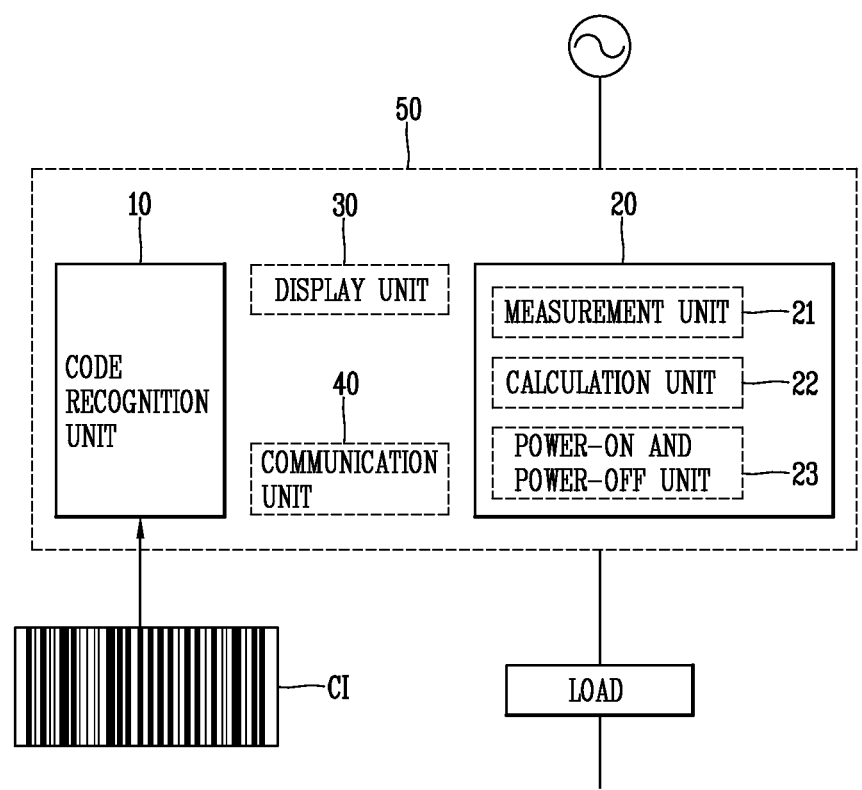
FIG. 4 is a block diagram illustrating a configuration of a prepayment-type watt-hour according to an embodiment of the present invention, which is disclosed in the present specification.

FIG. 4 is a block diagram illustrating a configuration of the prepayment-type watt-hour according to the embodiment of the present invention, which is disclosed in the present specification.

FIG. 5 is a flowchart illustrating an operational process that is performed by the prepayment-type watt-hour according to the embodiment of the present invention, which is described in the present disclosure.

Figure 6A:
FIGS. 6A and 6B are a diagram illustrating a code image that is recognized by the prepayment-type watt-hour meter according to the embodiment of the present invention, which is disclosed in the present disclosure.
Figure 6B:
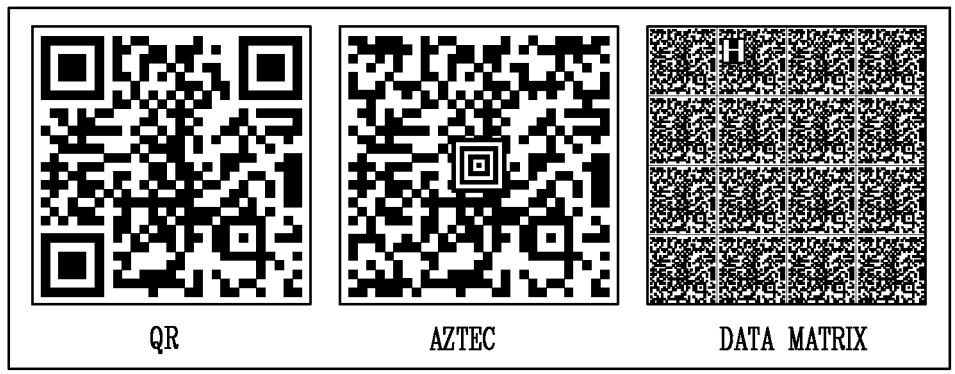

FIGS. 6A and 6B are a diagram illustrating a code image that is recognized by the prepayment-type watt-hour meter according to the embodiment of the present invention, which is disclosed in the present disclosure.

A watt-hour meter 50, as illustrated in FIG. 3, includes a code recognition unit 10 and a control unit 20. The code recognition unit 10 recognizes a code image in which information on prepayment of a charge-based amount of electric power that is to be consumed by a load is stored as coded, and recognizes the information on the prepayment, which is stored in the code image. The control unit 20 measures the amount of electric power consumption, and calculates an electric bill based on the measured amount of electric power consumption, based on the information on the prepayment recognized in the code recognition unit 10.

The watt-hour meter 50 is installed in the load.

The watt-hour meter 50 measures the amount of consumption of electric power that is supplied to the load.

The watt-hour meter 50 calculates the electric bill based on the measured amount of electric power consumption.

The watt-hour meter 50 controls a supply of electric power to the load according to the calculated electric bill.

For example, the watt-hour meter 50 performs the control in such a manner that electric power stops being supplied to the load or continues to be supplied to the load, depending on whether or not the electric bill is paid, whether or not the electric bill exceeds a reference electric bill that is determined in advance, or the like.

That is, the watt-hour meter 50 controls the supply of electric power to the load, measures the amount of electric power that is supplied to the load, and calculates the electric bill.

The code recognition unit 10 may be a code reader that recognizes the code image.

The code recognition unit 10 may be a code sensor that recognizes the code image.

The code recognition unit 10 is provided in an external frame of the watt-hour meter in such a manner that the code recognition unit 10 can recognize the code image.

The control unit 20 is a central processing unit of the watt-hour meter 50.

The control unit 20 controls the supply of electric power to the load, measures the amount of electric power that is consumed by the load, and calculates the electric bill for the measured amount of electric power.

The control unit 20 is provided in an internal circuit or a module of the watt-hour meter 50, in such a manner that the control unit 20 controls the supply of electric power, measures the amount of electric power consumption, and calculates the electric bill for the measured amount of electric power consumption.

All constituent elements of the watt-hour meter 50, which are illustrated in FIG. 3, are not necessary constituent elements. The watt-hour meter 50 may be realized by more than or less than the constituent elements illustrated in FIG. 3.

The watt-hour meter 50 may be realized as illustrated in FIG. 4, and may perform the same process as illustrated in FIG. 5.

The watt-hour meter 50 is connected to a system that supplies electric power to the load or to between an electric power supply source and the load.

The watt-hour meter 50 includes the code recognition unit 10 and the control unit 20, and, in addition to these, may further include one or more constituent elements.

The code recognition unit 10 is provided to the watt-hour meter 50 in such a manner that the code recognition unit 10 can recognize the code image CI.

The code image CI is an image in which the information on the prepayment of the charge-based amount of electric power is stored as coded.

The code image CI is an image in a barcode format as illustrated in FIG. 6A.

The barcode is expressed by a machine-readable combination of upright bars that have different thickness to represent letters, numbers, symbols, and is optically readable.

The code image CI is an image in the format of any one of a quick response code (QR code), an Aztec code, and a data matrix as are illustrated in FIG. 6B.

The QR code, the Aztec code, and the data matrix code mean barcodes in the matrix format that indicates information as black square dots in a square grid on a white background.

The code image CI is issued in the format of an electronic image that is stored on a mobile terminal or in the format of an image on a printed matter and is used.

In addition to the information on the prepayment of the charge-based amount of electric power, the code image CI may further information on the issue of the code image CI, information on the expiration date of the code image CI, and the like.

The information on the prepayment may be information indicating that the charge-based amount of electric power was paid for in advance.

The information on the prepayment may be information based on which a price for the charge-based amount of electric power is deducted from the calculated electric bill.

The information on the prepayment may be information based on which electric power is additionally consumed by as much as the charge-based amount of electric power corresponding to the information on the prepayment.

The code recognition unit 10 scans and recognizes the code image CI.

The code recognition unit 10 scans and recognizes the code image CI at the same time, and thus recognizes the code image CI at a time.

The code recognition unit 10 recognizes the code image CI and determines whether or not the code image CI is valid.

That is, the code recognition unit 10 determines whether or not the code image CI is legitimately issued.

The code recognition unit 10 determines whether or not the code image CI is legitimately issued, and, in a case where the code image CI legitimately issued, recognizes the information of the prepayment.

The code recognition unit 10 determines whether or not the code image CI is legitimately issued, and in a case where the code image CI is not legitimately issued, outputs a code error mark indicating that the code image is not an invalid code.

In a case where the code image CI is not valid and thus is not recognized more than three times, the code recognition unit 10 may disable a recognition function in such a manner that the invalid code image CI cannot be recognized for a predetermined time.

The control unit 20 includes a measurement unit 21, a calculation unit, and a power-on and power-off unit 23. The measurement unit 21 measures the amount of electric power consumption. The calculation unit 22 calculate the electric bill. The power-on and power-off unit control the supply of electric power to the load.

The measurement unit 21 detects voltage and electric current that are supplied to the load, and based on this, measures the amount of electric power consumption.

The calculation unit 22 calculates the electric bill based on the amount of electric power consumption and the information on the prepayment.

The power-on and power-off unit 23 controls the supply of electric power to the load according to a state of the load, the amount of electric power consumption, the electric bill, and the like.

For example, in a case where something is wrong with the load, or the amount of electric power consumption or the electric bill exceeds an appropriate reference value that is determined in advance, the power-on and power-off unit 23 stops supplying electric power to the load in order to control the supply of the electric power to the load.

The control unit 20 calculates the electric bill based on the amount of electric power consumption and the information on the prepayment, but calculates the electric bill in such a manner that a price for the charge-based amount of electric power corresponding to the information on the prepayment is deducted from the electric bill.

For example, assume that a price for the charge-based amount of electric power corresponding to the information on the prepayment is "1,000 WON (Korean currency)," and the electric bill for the amount of electric power consumption is "3000 WON." In this case, "2,000 WON," which results from deducting "1,000 WON," which is the price for the charge-based amount of electric power corresponding to the information on the prepayment, from "3,000 WON," which is the electric bill for the amount of electric power consumption, is calculated as the electric bill.

The control unit 20 allows the load to additionally consume electric power by as much as the charge-based amount of electric bill corresponding to the information on the prepayment.

For example, assume that a price for the charge-based amount of electric bill corresponding to the information on the prepayment is "1,000 WON," and an amount of electric power corresponding to the price for the charge-based amount of electric bill that is "1,000 WON" is "2 KWH." In this case, the load is allowed to additionally consume electric power by "2 KWH."

In a case where an amount of electric power that is additionally consumed falls short of the charge-based amount of electric bill corresponding to the information on the prepayment, the control unit 20 generates repayment information for returning an unconsumed portion of the charge-based amount of electric power corresponding to the information on the prepayment, and generates and outputs a repayment code image in which the information on the repayment is stored.

For example, assume that a price for the charge-based amount of electric power according to the information on the prepayment is "1,000 WON," and only 500 WON's worth of the charge-based amount of electric power corresponding to the information is additionally consumed, leaving 500 WON's worth of the charge-based amount unconsumed. In this case, the control unit 20 generates the repayment information for returning a price of 500 WON, and generates the repayment code image in which the repayment information is stored.

The repayment code image is recognized through a device that can recognize the code image CI.

When the repayment code image is recognized through an external device that can recognize the code image CI, the repayment information is recognized in such a manner that the price of 500 WON can be returned according to the repayment information.

The repayment code image is an image in the format of any one of a barcode, a QR code, an Aztec code, and a data matrix.

The repayment code image is output in the format of an electronic image that is stored on a mobile terminal or in the format of an image on a printed matter and is used.

The repayment code image is re-recognized through the code recognition unit 10 as well.

The repayment code image is re-recognized through the code recognition unit 10 in such a manner that the price for the unconsumed portion of the charge-based amount according to the repayment information is deducted from the electric bill.

The repayment code image is re-recognized through the code recognition unit 10 as well, and thus the load can consume electric power by as much as the price for unconsumed portion of the charge-based amount according to the repayment information.

In a case where the code recognition unit 10 recognizes the information on the prepayment, but the supply of electric power to the load is stopped, the control unit 20 performs control that resumes the supply of electric power to the load based on the charge-based amount of electric power corresponding to the information on the prepayment.

That is, when the information on the repayment indicating that the charge-based amount of electric power was paid for in advance is recognized, this means that the charge-based amount of electric power corresponding to the information on the prepayment was paid for, the supply of the electric power to the load to, the supply of electric power to which is stopped due to non-payment of the electric bill and the like is resumed.

The watt-hour meter 50 is configured as described above, and may further include a display unit 30 on which the amount of electric power consumption, the electric bill, and the information on the prepayment are externally displayed.

The display unit 30 is a display unit on which information on a current status of the watt-hour meter 50 is externally displayed.

A numerical value of each of the amount of electric power consumption, the electric bill and the information on the prepayment is displayed on the display unit 30.

The control unit 20 transmits the amount of electric power consumption, the electric bill, and the information on the prepayment to the display unit 30 in order to externally display the information on the current status of the watt-hour meter 50 on the display unit 30.

The display unit 30 is provided in an extremal frame of the external frame of the watt-hour meter in such a manner that each of the amount of electric power consumption, the electric bill and the information on the prepayment is externally displayed on the display unit 30.

A recognized state of the code image CI, a validity of the code image CI, price information on the charge-based amount of electric power corresponding to the information on the prepayment, price information on the unconsumed portion of the charge-based amount of electric power, and the like are displayed on the display unit 30.

The watt-hour meter 50 is configured as described above, and may further include a communication unit 40 that commutates with an external device for exchange of information.

The external device is a device to which the code image CI is issued, a device that issues the code image CI, a mobile terminal on which the code image is stored, or the like.

The communication unit 40 notifies the external device of information of the watt-hour meter 50 on the amount of electric power consumption by the load, and on the electric bill through the communication with the external device.

By communicating with the external device, the communication unit 40 notifies the external device of the information of the watt-hour meter 50 on whether or not the code image CI is recognized, whether or the repayment code image is output, and the like.

The communication unit 40 receives information on the issuance of the code image CI from the device to which the code image CI is issued, the device that issues the code image CI, the mobile terminal on which the code image is stored, or the like.

That is, through the communication unit 40, information on whether or not the code image CI is legitimately issued is received from the device to which the code image CI is issued, and based on this information, the code recognition unit 10 determines the validity of the code image CI and recognizes the information on the prepayment.

For realization, the prepayment-type watt-hour meter according to the embodiment, which is disclosed in the present specification, is applied to a watt-hour meter that measures the amount of electric power consumption by the load and control the supply of electric power to the load.

For realization, the prepayment-type watt-hour meter according to the embodiment, which is disclosed in the present specification, is applied to an electric bill payment device and an electric bill payment system.

For realization, the prepayment-type watt-hour meter according to the embodiment, which is disclosed in the present specification, is applied to an electric power supply device, an electric power supply system, an electric power control device, and an electric power control system.

The prepayment-type watt-hour meter disclosed in the present specification recognizes the information on the prepayment through the code image in which the information on the prepayment is stored, and thus an advantage of recognizing the information on the prepayment in a fast, convenient manner is provided.

The prepayment-type watt-hour meter disclosed in the present specification recognizes the information on the prepayment through the code image in which the information on the prepayment is stored, and thus an advantage of making the prepayment of the charge-based amount for electric power in a convenient manner without adding separate constituent elements and a separate device is provided.

The prepayment-type watt-hour meter disclosed in the specification recognizes the information on the prepayment that is stored in the code image, and based on this, calculates the electric bill, thereby providing an advantage of supplying electric power and controlling the supply of electric power in various manners.

The prepayment-type watt-hour meter disclosed in the present specification recognizes the information on the prepayment that is stored in the code image, and based on this, calculates the electric bill, thereby providing an advantage of calculating the electric bill and making the payment of the calculated electric bill in various manners.

The embodiments of the present invention, which are described above, are disclosed to solve the technical problems in the related art. Various modifications, alterations, additions and the like that are possible within the scope of the nature and gist of the present invention are apparent to a person of ordinary skill in the art to which the present invention pertains. Thus, such modifications, alterations, and additions fall within the scope of claims.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A prepayment-type watt-hour meter comprising:
   a code recognition unit that recognizes a code image in which information on prepayment of a charge-based amount of electric power that is to be consumed by a load is stored as coded, and that recognizes the information on the prepayment that is stored in the code image; and
   a control unit that measures an amount of electric power consumption by the load, and that calculates the electric bill for the measured amount of electric power, based on the information on the prepayment that is recognized by the code recognition unit,
   wherein the code recognition unit determines a validity of the code image, and
   in a case where the code image is valid, recognizes the information of the prepayment, and in a case where the code image is not valid, outputs a code error mark indicating that the code image is not a valid code, and
   wherein if the code image is not valid and is not recognized for more than a preset number of times, the code recognition unit disables a recognition function so that the invalid code image is not recognized for a predetermined time.

2. The prepayment-type watt-hour meter of claim 1, wherein the image code image is an image in the format of any one of a barcode, a quick response (QR) code, an Aztec code, and a data matrix code.

3. The prepayment-type watt-hour meter of claim 1, wherein, based on the information on the prepayment, a price for the charge-based amount of electric power is deducted from the calculated electric bill, or electric power is additionally consumed by as much as the price for the charge-based amount of electric power.

4. The prepayment-type watt-hour meter of claim 1, wherein, in a case where an amount of electric power that is additionally consumed falls short of the charge-based amount of electric bill corresponding to the information on the prepayment, the control unit generates repayment information for returning an unconsumed portion of the charge-based amount of electric power corresponding to the information on the prepayment, and generates and outputs a repayment code image in which the information on the repayment is stored.

5. The prepayment-type watt-hour meter of claim 1, wherein, in a case the code recognition unit recognizes the information on the prepayment, but supply of electric power to the load is stopped, the control unit performs control that resumes the supply of electric power to the load based on the charge-based amount of electric power corresponding to the information on the prepayment.

6. The prepayment-type watt-hour meter of claim 1, further comprising a display unit on which the amount of electric power consumption, the electric bill and the information on the prepayment are externally displayed.

7. The prepayment-type watt-hour meter of claim 6, wherein, based on the information on the prepayment, a price for the charge-based amount of electric power is deducted from the calculated electric bill, or electric power is additionally consumed by as much as the price for the charge-based amount of electric power.

8. The prepayment-type watt-hour meter of claim 6, wherein the code recognition unit recognizes the code image and thus determines a validity of the code image, and in a case where the code image is valid, recognizes the information on the prepayment.

9. The prepayment-type watt-hour meter of claim 6, wherein, in a case where an amount of electric power that is additionally consumed falls short of the charge-based amount of electric bill corresponding to the information on the prepayment, the control unit generates repayment information for returning an unconsumed portion of the charge-based amount of electric power corresponding to the information on the prepayment, and generates and outputs a repayment code image in which the information on the repayment is stored.

10. The prepayment-type watt-hour meter of claim 6, wherein, in a case the code recognition unit recognizes the information on the prepayment, but supply of electric power to the load is stopped, the control unit performs control that resumes the supply of electric power to the load based on the charge-based amount of electric power corresponding to the information on the prepayment.

11. The prepayment-type watt-hour meter of claim 1, further comprising a communication unit that communicates with an external device for exchange of information.

12. The prepayment-type watt-hour meter of claim 11, wherein, based on the information on the prepayment, a price for the charge-based amount of electric power is deducted from the calculated electric bill, or electric power is additionally consumed by as much as the price for the charge-based amount of electric power.

13. The prepayment-type watt-hour meter of claim 11, wherein the code recognition unit recognizes the code image and thus determines a validity of the code image, and in a case where the code image is valid, recognizes the information on the prepayment.

14. The prepayment-type watt-hour meter of claim 11, wherein, in a case where an amount of electric power that is additionally consumed falls short of the charge-based amount of electric bill corresponding to the information on the prepayment, the control unit generates repayment information for returning an unconsumed portion of the charge-based amount of electric power corresponding to the information on the prepayment, and generates and outputs a repayment code image in which the information on the repayment is stored.

15. The prepayment-type watt-hour meter of claim 11, wherein, in a case the code recognition unit recognizes the information on the prepayment, but supply of electric power to the load is stopped, the control unit performs control that resumes the supply of electric power to the load based on the charge-based amount of electric power corresponding to the information on the prepayment.

* * * * *